A. S. HOLLAND.
MOBILE POULTRY AND ANIMAL CAGE.
APPLICATION FILED FEB. 5, 1915.
1,212,771. Patented Jan. 16, 1917.
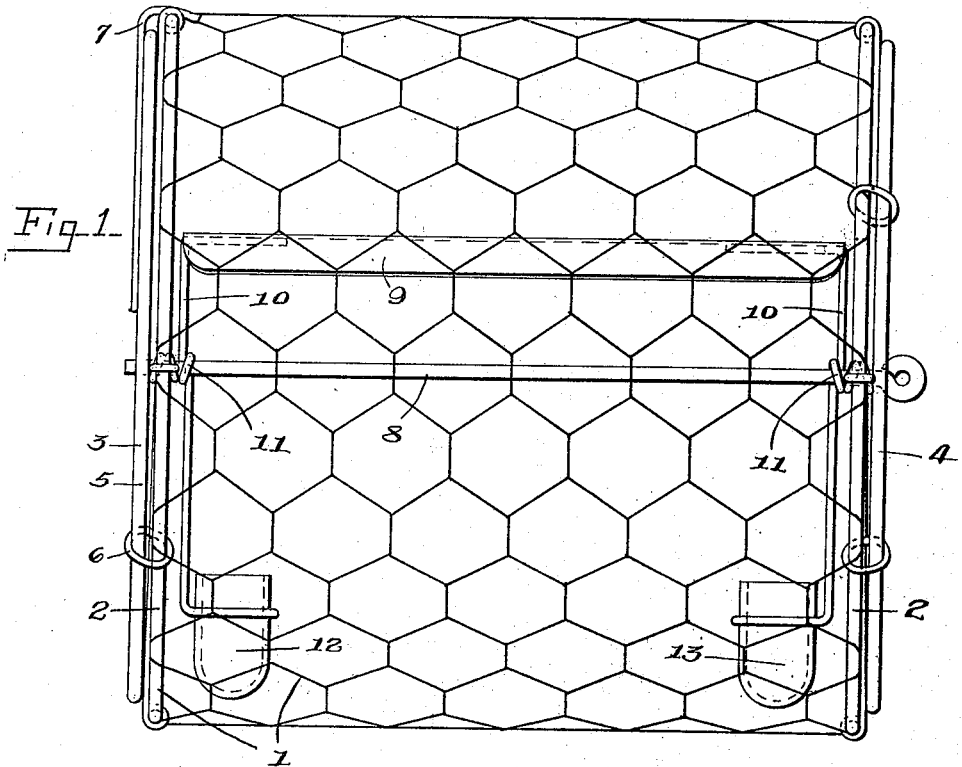
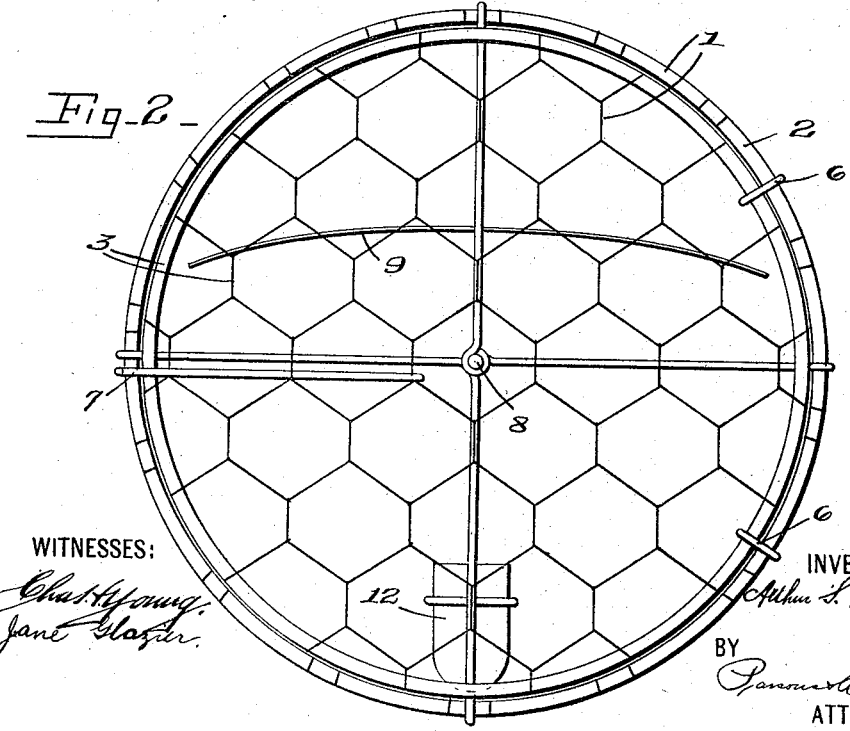
WITNESSES:
INVENTOR
BY
ATTORNEYS

UNITED STATES PATENT OFFICE.

ARTHUR S. HOLLAND, OF HOMER, NEW YORK.

MOBILE POULTRY AND ANIMAL CAGE.

1,212,771.   Specification of Letters Patent.   Patented Jan. 16, 1917.

Application filed February 5, 1915. Serial No. 6,213.

*To all whom it may concern:*

Be it known that I, ARTHUR S. HOLLAND, a citizen of the United States, and a resident of Homer, in the county of Cortland and State of New York, have invented a certain new and useful Mobile Poultry and Animal Cage, of which the following is a specification.

This invention has for its object the production of a poultry and animal cage by which poultry or animals can be permitted to run on lawns or in parks without being able to damage the same, but at the same time being able to feed; and the invention consists in the novel features hereinafter set forth and claimed.

In describing this invention, reference is had to the accompanying drawings, in which like characters designate corresponding parts in all the views.

Figure 1 is a side elevation of this cage. Fig. 2 is an end view thereof.

This cage is cylindrical in general form and the walls thereof are formed of open work, the cage being capable of being rolled along the ground forwardly or backwardly, as the bird or animal steps to the front or the rear of the vertical plane passing through the axis of the cage.

1 designates the cylindrical cage which, as here shown, consists of rings 2 at its opposite ends which constitute the frame thereof, a cylindrical wall of reticulated or similar material, as wire mesh, secured at its edges to the ring 2, and also reticulated heads or ends 3, 4 secured to said rings. One of the heads as 3 is movable and forms a gate for the cage. This head 3 consists of a ring 5 to which the reticulated material or wire mesh is secured, the ring 5 being hinged by links 6 to one of the rings 2 and being held in closed position by a suitable latch 7 engaging the contiguous ring 3.

8 is an axle extending through the drum.

9 is a shelter or roof supported from the axle by supports 10 having bearings 11 on the axle, these supports extending below the axle and carrying weights at their lower ends which, when the drum is rolling, hold the roof or shelter from turning with the drum. These weights are preferably food and water receptacles 12, 13.

In operation, a bird, as a chicken or an animal, in the cage can progress along the lawn and feed as it progresses, but is unable to dig or scratch. By this cage, the bird or animal has the advantage of a free range but is protected from harm and prevented from doing damage. Furthermore, by this cage, people in cities can keep a few chickens without danger of the same becoming a nuisance to neighbors.

What I claim is:—

A poultry and animal cage consisting of a cylindrical body rollable along the ground, one of the ends thereof being removable and the walls of the cylinder being reticulated so that the bird or animal therein can feed off the ground through said walls, and means located in the cylinder for supporting food and water receptacles, said means being non-rotatable with the cylinder, substantially as and for the purpose set forth.

In testimony whereof, I have hereunto signed my name in the presence of two attesting witnesses, at Homer, in the county of Cortland, and State of New York, this 29th day of January, 1915.

ARTHUR S. HOLLAND.

Witnesses:
 MASON J. GORDON,
 EDITH M. POTTER.

Copies of this patent may be obtained for five cents each, by addressing the "Commissioner of Patents, Washington, D. C."